April 9, 1940.　　　A. GASCA　　　2,196,792
AUTOMATIC MACHINE FOR APPLYING STAMPS OR THE LIKE
Filed Jan. 24, 1939　　　8 Sheets-Sheet 1

Inventor:
Albin Gasca
per F. Dittmar
Attorney

April 9, 1940. A. GASCA 2,196,792
AUTOMATIC MACHINE FOR APPLYING STAMPS OR THE LIKE
Filed Jan. 24, 1939 8 Sheets-Sheet 2
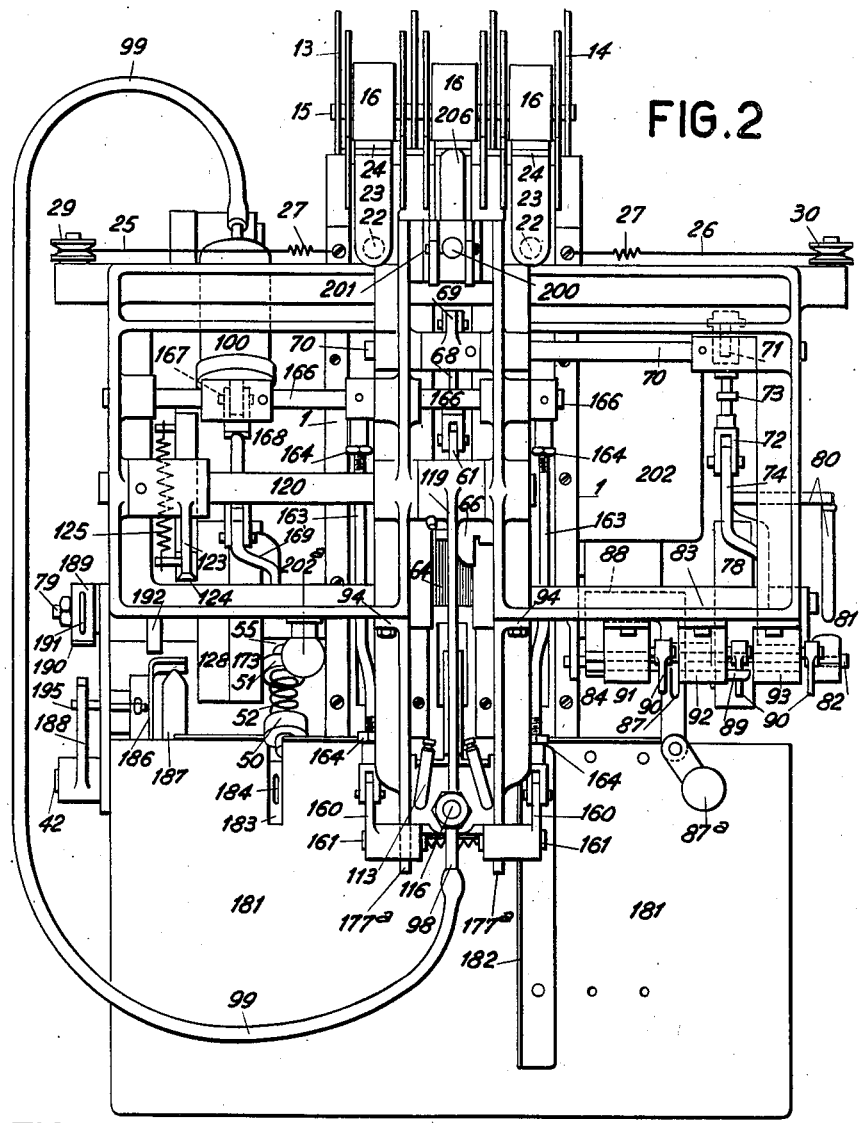

April 9, 1940.  A. GASCA  2,196,792
AUTOMATIC MACHINE FOR APPLYING STAMPS OR THE LIKE
Filed Jan. 24, 1939  8 Sheets-Sheet 3

April 9, 1940.  A. GASCA  2,196,792
AUTOMATIC MACHINE FOR APPLYING STAMPS OR THE LIKE
Filed Jan. 24, 1939  8 Sheets-Sheet 4

Inventor:
Albin Gasca

April 9, 1940.　　　　　　　A. GASCA　　　　　　　2,196,792
AUTOMATIC MACHINE FOR APPLYING STAMPS OR THE LIKE
Filed Jan. 24, 1939　　　　8 Sheets-Sheet 5
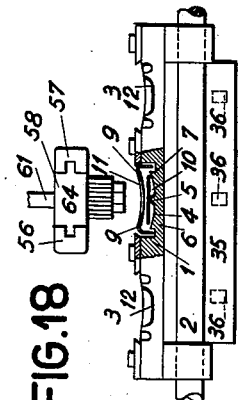
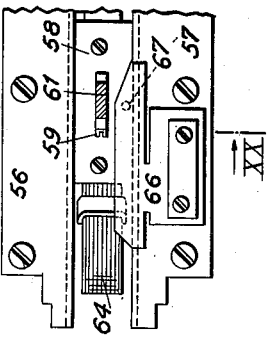
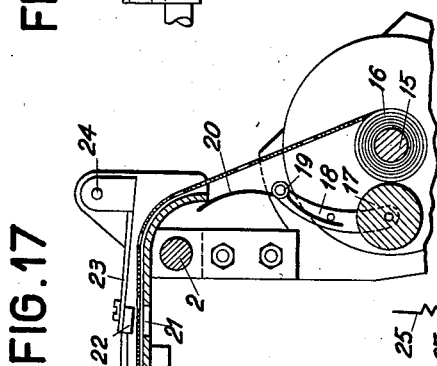
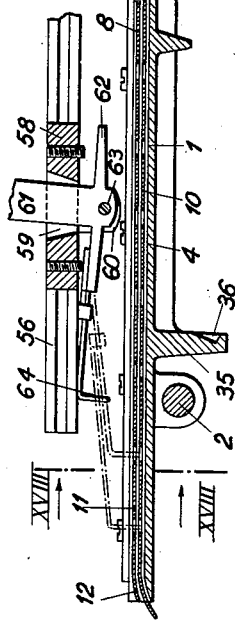
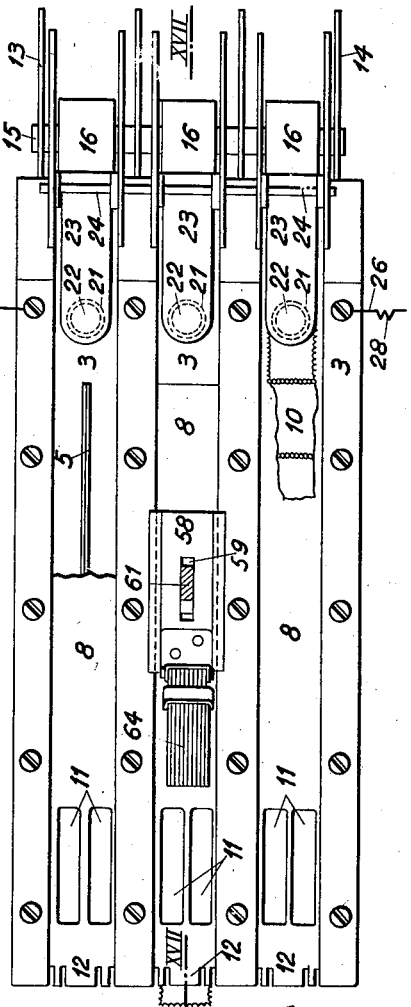

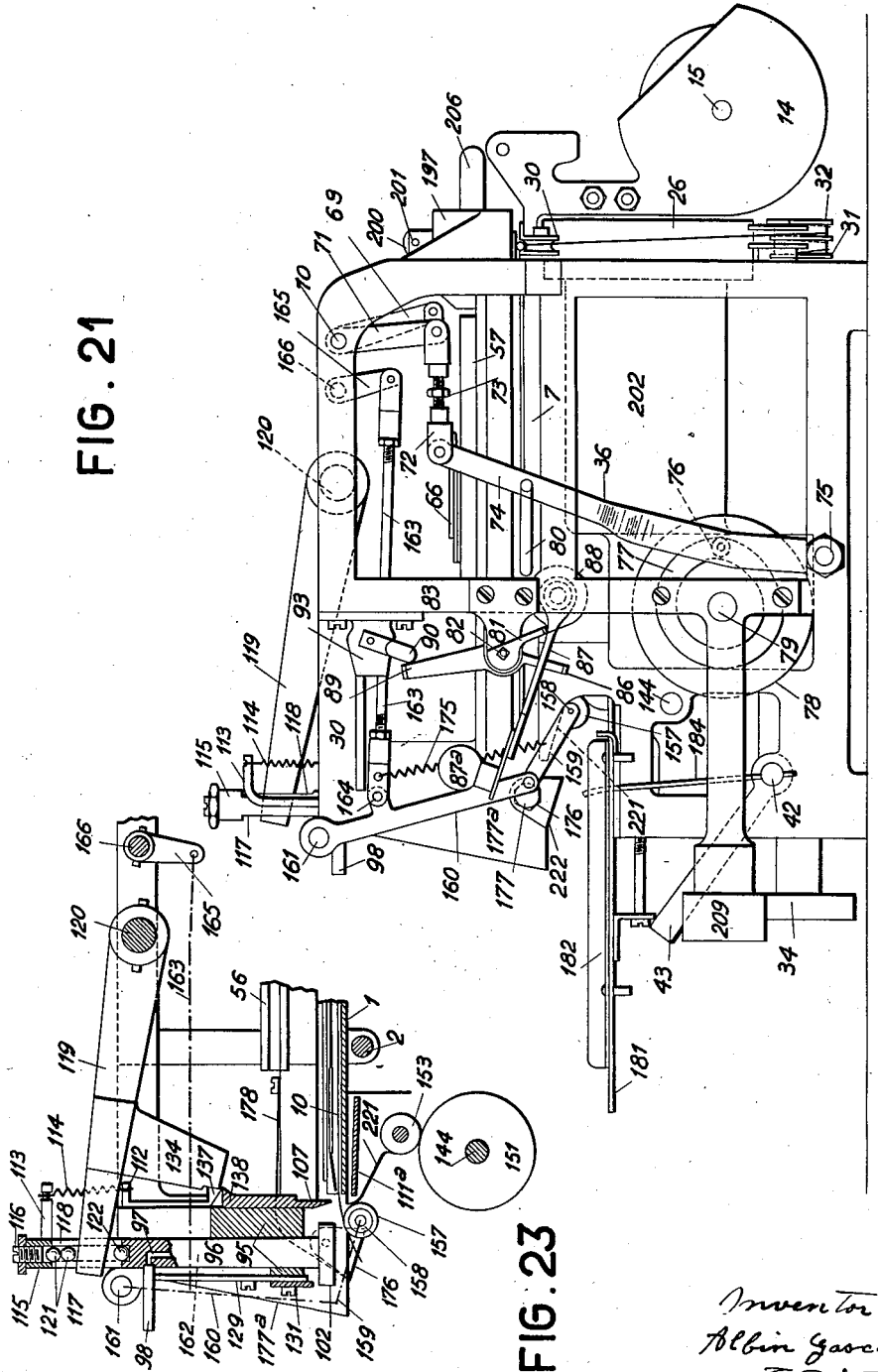

April 9, 1940.　　　A. GASCA　　　2,196,792
AUTOMATIC MACHINE FOR APPLYING STAMPS OR THE LIKE
Filed Jan. 24, 1939　　　8 Sheets-Sheet 7
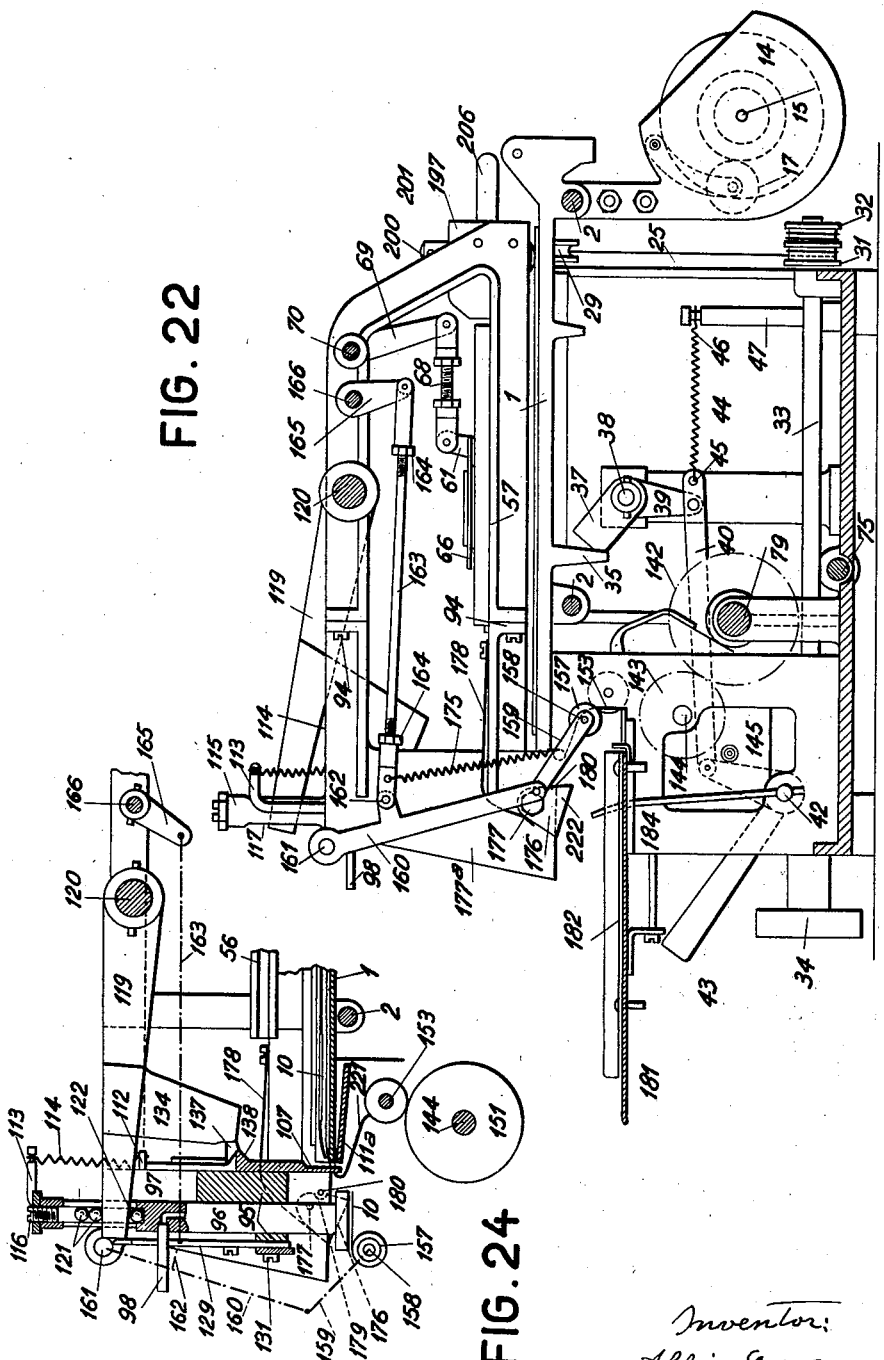

April 9, 1940.  A. GASCA  2,196,792
AUTOMATIC MACHINE FOR APPLYING STAMPS OR THE LIKE
Filed Jan. 24, 1939   8 Sheets-Sheet 8

Inventor:
Albin Gasca
per F. Dittmar
Attorney

Patented Apr. 9, 1940

2,196,792

UNITED STATES PATENT OFFICE 2,196,792

AUTOMATIC MACHINE FOR APPLYING STAMPS OR THE LIKE

Albin Gasca, Paris, France

Application January 24, 1939, Serial No. 252,701
In France March 29, 1938

6 Claims. (Cl. 216—11)

This invention relates to a machine for providing sheets, packets or the like with postage stamps or the like of the type, wherein use is made of postage stamps or the like in ribbon form, the stamps of each ribbon being separated from the adjoining stamps by perforations, a selected one of the ribbons being advanced by claws in front of the stamp moistener and a pad which, after severing of the ribbon by a knife, applies the severed portion to a packet or the like on a tray.

The machines of this type known up to the present have the drawback of not offering absolute security in regard to the running of the ribbons, nor are they absolutely automatic in operation as they are required to be operated by hand.

The invention provides on the contrary for automatic operation by an electric motor which is set in motion as soon as the packet to be stamped is placed in position, means being provided to ensure the progress of the ribbon without breaking or stopping the operations of moistening, cutting and sticking.

The machine is electrically blocked when the supply of stamps is exhausted. A luminous indicator is provided, and the stamped packet is automatically ejected by the same means which served to start the operation of the motor. The only manual operation to be performed by the operator, should such be necessary, is that of operating a steering wheel to bring the device for stamping in front of the type of stamps to be applied.

The various elements of the machine which are utilized in combination, will be indicated in the course of the description of the annexed drawings which represent an example of a machine constructed according to the invention, provided with three different rolls of ribbons, but it is obvious that a larger number may be provided if so desired.

Referring to the drawings:

Fig. 2 is a plan view.

Fig. 8 is an axial section of the plunger for applying the stamps.

Fig. 9 is a side view, on a larger scale, of the pad covering the head of the plunger.

Fig. 10 is a corresponding plan view.

Fig. 11 is a section according to 11—11 of Fig. 10.

Fig. 12 is a section according to 12—12 of Fig. 9.

Fig. 13 is a section according to 13—13 of Fig. 10.

Fig. 16 is a plan view of the stamp bearing carriage.

Fig. 17 is a section according to 17—17 of Fig. 16.

Fig. 18 is a section according to line 18—18 of Fig. 17.

Fig. 19 is a plan view, on a larger scale, of the sliding piece for the progress of the stamps.

Fig. 20 is a section according to line 20—20 of Fig. 19.

Fig. 21 is a side view of the machine.

Fig. 22 is a section according to line 22—22 of Fig. 1.

Fig. 23 is a detail view, showing, in section, the mechanism for moistening the stamps.

Fig. 24 is a similar view, but from another position, showing the cutting of a ribbon of stamps.

Figure 1:
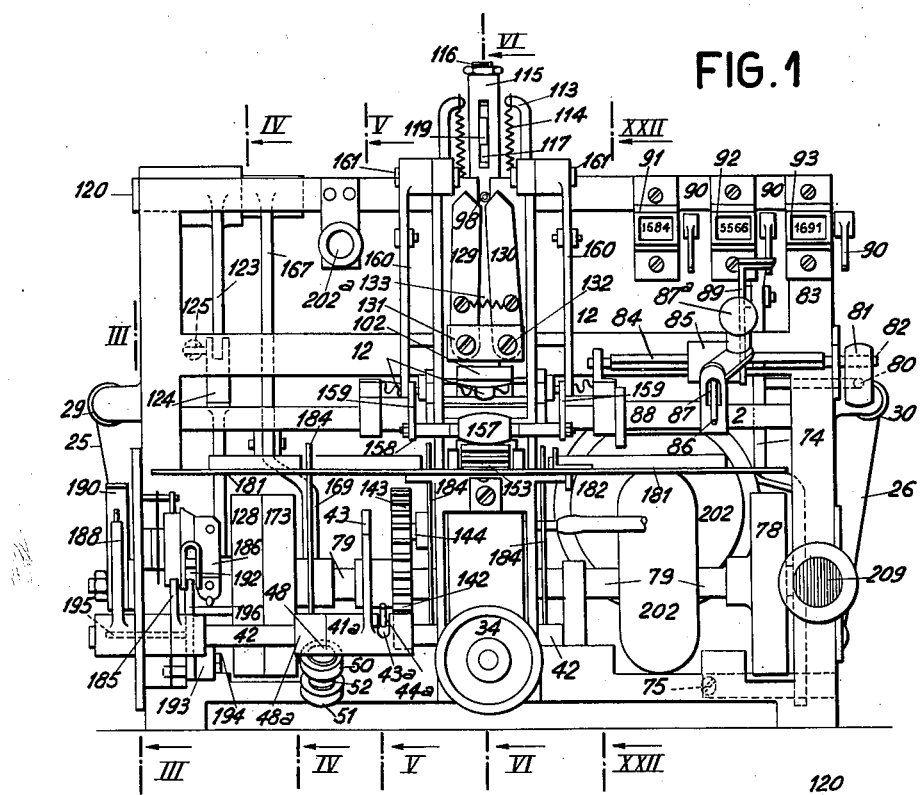
Fig. 1 is a front view.
Figure 3:
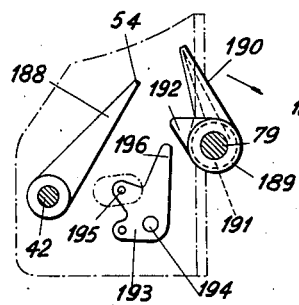
Fig. 3 is a section according to 3—3 of Fig. 1.

The machine comprises a stamp bearing carriage 1 which is mounted on fixed stays 2 of the machine, in such a manner as to be able to slide the length of these, when it is desired to change the type of stamps to be applied, as will be seen further on. This carriage comprises, as shown, three passages or grooves 3 of which the bottom 4 is formed by an arcuate surface. This bottom 4 carries a middle rib 5 and lateral ribs 6 and 7 any number of these ribs can be provided. The bottom 4 may, for example, only carry one central rib. A cover 8, with downturned sides 9, covers each of these grooves. The co-operation of the bottom 4 and of the cover 8 therefore imposes on the stamps 10 moving along the grooves, a slightly arched form; on the other hand, the presence of the ribs, such as 5, ensures an empty space between the stamps and the bottom 4.

Towards their forward ends the covers 8 are formed with windows 11, thereby leaving the surface of the stamps exposed for a certain length. The forward end portions of the covers 8 and the bottoms 4 are slightly curved downwards to form entrances 12.

At the rear end of the carriage 1 between cheeks 13 and 14, an axle 15 is arranged on which rolls of stamps 16 are mounted, three in number in the present example. Upon each of these rolls a pressing roller 17 is applied each roller being mounted at the end of an arm 18 articulated around an axle 19, and actuated towards the corresponding roll by a blade spring 20.

The covers 8 terminate a short distance before the rear end of the carriage. Perforations 21 are formed in the bottoms 4 towards this end and beyond the said covers; and above each of these perforations a lozenge 22 is arranged at the end of a flexible arm 23 mounted on an axle 24 in such a manner that the lozenges 22 take hold upon the ribbons of stamps issuing from the rolls 16 as long as the said ribbons are presented opposite the perforations 21.

Pulleys 31 and 32 are keyed to a shaft 33 extending longitudinally of the machine and provided with an operating wheel 34 at its front end. A cable is wound upon the pulleys 31 and 32 with portions 25 and 26 extending in opposite directions from the pulleys and upwardly at sides of the machine, as shown in Figure 1, where they are engaged with guide pulleys 29 and 30 and brought inwardly, as shown in Figure 2, and connected to opposite sides of the carriage 1 through the medium of retractile springs 27 and 28.

The carriage 1 has a ledge 35 running transversely thereof in which notches 36 are formed to the right of the grooves 3. These notches co-operate with a mounted latch 37 pivoting around an axle 38, and which, beyond this, is extended by means of a crank arm 39 pivoted at the end of a small connecting rod 40. This rod is pivoted at its other end to a lever 41 rigid with a sleeve 41ª mounted freely around a transversely extending shaft 42 mounted so as to rotate in the frame of the machine. The arm 43 of this lever when depressed serves to turn the sleeve and exert pull upon the rod 40 to release the latch 37 from the notches 36, against the action of a spring 44, attached at one end of the connecting rod 40 and at its other end engaged about the neck 46 of a fixed column 47 of the machine.

Figure 5:
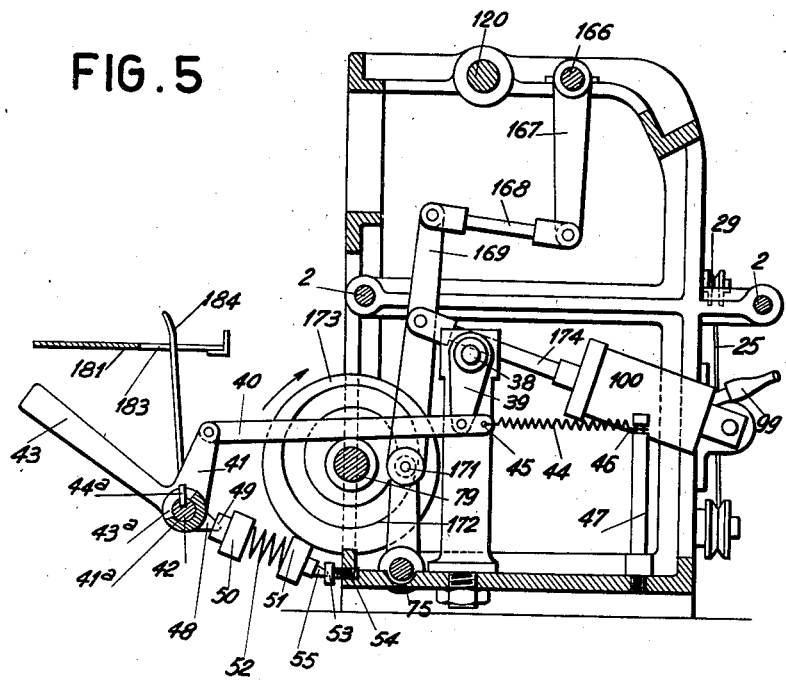
Fig. 5 is a section according to 5—5 of Fig. 1.

Referring to Figure 5 it will be seen that a tenon 48 is rigid with a sleeve 41ª, keyed on the shaft 42 and is engaged in a recess 49 formed in a small block 50 which is connected to a similar block 51 by means of a coil spring 52. The block 51 is mounted for pivoting on a head 53 of a screw 54, by means of a point 55 engaging in a recess arranged on the said head. The sleeve 41ª is provided with a slot 43ª in which is engaged a spur 44ª driven into the shaft 42.

Above the carriage there are two rails 56 and 57 for guiding a sliding piece 58 having a central opening 59 and ears 60 at opposite sides thereof. The arm 61 of the beam 62 is pivoted between the ears 60 by a pin 63 and extends upwardly through the said opening. The beam 62 carries at its front end a claw 64 formed by an assembly of metal wires bent downwardly at their free ends. The width of the claw 64 is slightly less than that of a ribbon of stamps. On the rail 57 is fixed, by means of screws 65 a flexible plate 66 which presses with friction against a tenon 67 rigid with the sliding piece 58.

On the arm 61 is pivotally mounted a connecting rod 68 joined at its other end to a crank arm 69 keyed on a rocker shaft 70, extending transversely of the machine.

On this shaft another crank arm 71 is keyed at the end of which a connecting rod 72 is pivoted, the rod 72 being of adjustable length, by means of a screw-nut 73, and at its front pivoted to a lever 74. This lever is pivoted around a transversely extending axle 75, and has a roller 76 engaged in a cam path or groove formed in a disc 78, keyed on a transversal shaft 79.

On the lever 74 a driving rod 80 is fixed and extends laterally therefrom with one end in position for contact with a tumbler 81, keyed on an axle 82 mounted for rotation in the frame 83 of the machine. This axle has a squared extension 84 upon which is slidably mounted a block 85 bearing a finger 86; this finger being engaged in a slotted arm 87 having a bearing 88 slidably carried by the adjacent fixed stay in a sliding manner the length of the rigid traverse 2. The arm 87 bears a lamp 87ª.

The block 85 has in addition a bent digit 89 susceptible of co-operating, according to the position of the said block, with one or the other of the crank arms 90 serving for the operation of the meters 91, 92 and 93 respectively, which advance one unit each time that their corresponding crank arm receives an impulse from the digit 89.

On the front of the machine is fixed, by means of lugs 94, a guiding part 95 in the shape of a cylinder in which a plunger 96 may slide. This is formed with a channel 97 having its upper end extended forwardly at right angles and communicating with a pipe 98 to which a flexible tube 99 is attached. This flexible tube extends from a suction pump 100 fixed to the inside of the frame of the machine, at the rear thereof as shown in Figures 1 and 5.

The lower end of the plunger 96 terminates in a pressure head 101 covered by a pad 102 of an elastic material, formed with a central perforation 103 communicating with the channel 97. The inner surface of the pad 102 is formed with recesses or hollows 104 as shown in Figures 12 and 13.

Figure 7:
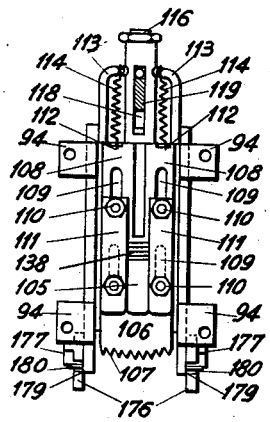
Fig. 7 shows a rear view of the knife for severing the stamps.
Figure 14:
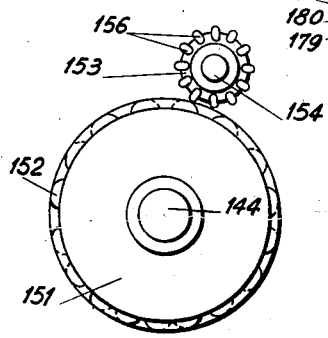
Fig. 14 is a side view, on a larger scale, of the device for wetting the moistening roller.

At the back of the guide 95 is mounted a knife 105 having its lower part formed with a cutting blade 106 of convex form in the example shown, and having teeth 107 as shown in Fig. 7. On the support 108 of the knife, slots 109 are formed co-operating with guiding screws 110 fixed in a rigid piece or presser plate 111. The anvil 111ª is located below the knife.

Between the tenons 112 of the support 108 and the brackets 113 of the plunger 96 coil springs 114 are arranged. The head 115 of the plunger 96 is perforated axially, the perforation being closed by a screw 116. The head 115 has in addition two slots 117 and 118 which communicate with the perforation and serve for the passage of an oscillating arm 119 keyed on a transversely extending shaft 120. The arm 119 may make contact with the plunger 96 towards the top and towards the bottom of the perforation, through the medium of bearings 121 and 122 as shown in Figures 23 and 24.

Figure 4:
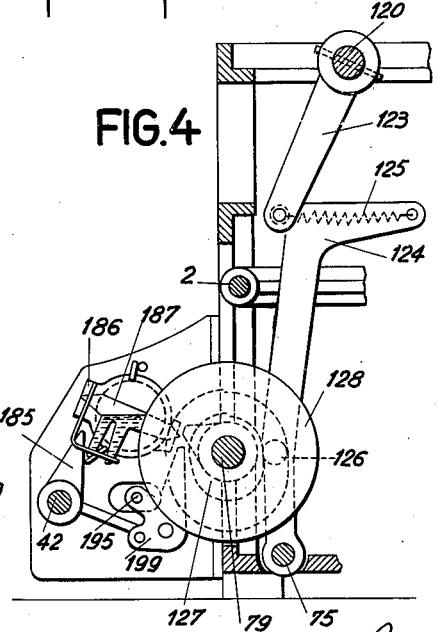
Fig. 4 is a section according to 4—4 of Fig. 1.

On the shaft 120 is keyed a crank arm 123 impelled to pressure against a lever 124 by a spring 125 interposed between those two parts as shown in Figure 4. The lever 124 which is loosely mounted around the axle 75 has at one point in its length a roller 126 engaged in an eccentric groove formed in a cam 127 arranged on a disc 128, keyed on a shaft 79.

Two blades 129 and 130 are pivotally mounted at the front of the machine by screws 131 and 132. They are constantly urged towards each other by a spring 133 and co-operate with the pipe 98 to oppose a certain resistance to the descending movement of the plunger 96.

On the arm 119 is mounted a box 134 between the sides of which an axle 135 is fixed serving as a pivot for a bell crank lever 136. One of the ends of this lever is enlarged to form a head 137 which co-operates with an edge 138 of the knife 106. The other end of this lever carries a cross pin slidably engaged in the slots 139 formed on the side walls of the box 134. A spiral spring 140 is interposed between the end 141 of the lever 136 and a fixed point of the box.

A toothed wheel 142 is keyed on the shaft 79 and meshes with a pinion 143 of which the axle 144 is rotatably mounted in the side walls of a basin 145. In the bottom 146 of this basin, a resistance constituting an electrical heating unit 148 is embedded. In the front wall 149 a pocket 150 is provided for receiving a thermostat to cause cutting off of the current circulating in the resistance 148 when the water in the basin 145 attains a predetermined temperature.

Figure 15:
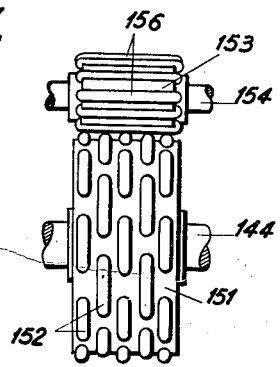
Fig. 15 is a corresponding front view.
Figure 6:
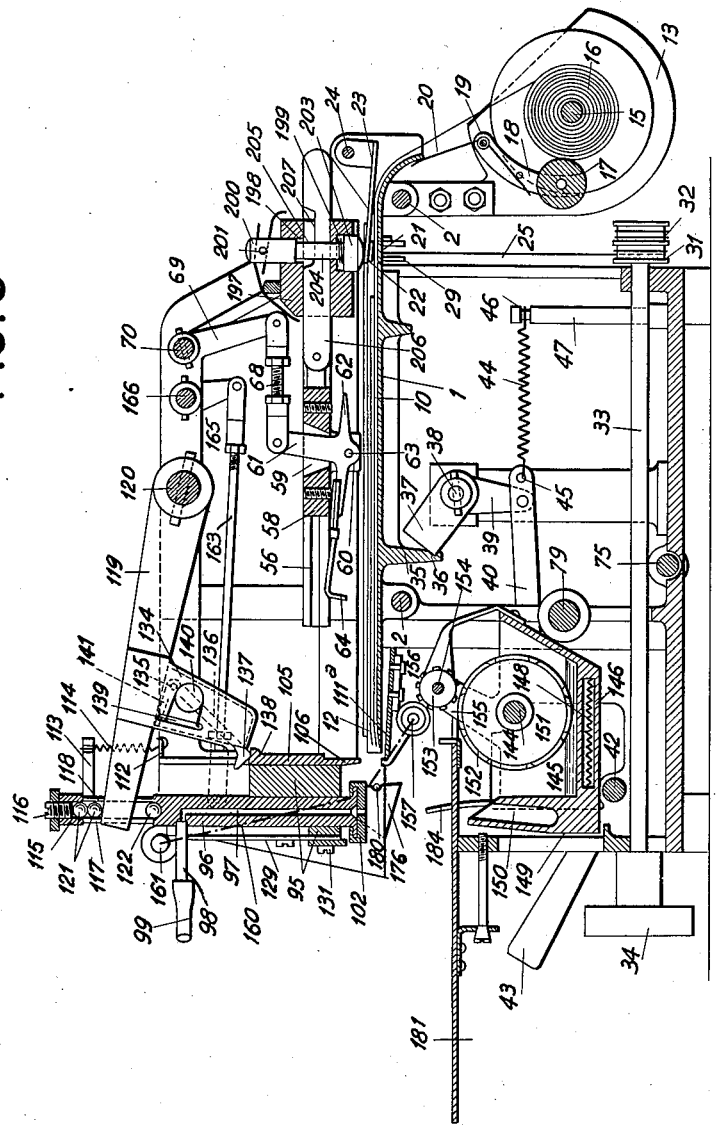
Fig. 6 is a section according to 6—6 of Fig. 1.
Figure 25:
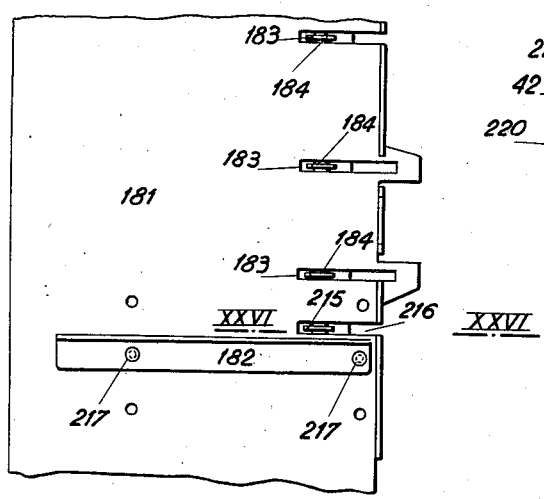
Fig. 25 is a plan view showing the supporting plate for the packages or the like, when a device for applying a second stamp is used.
Figure 26:
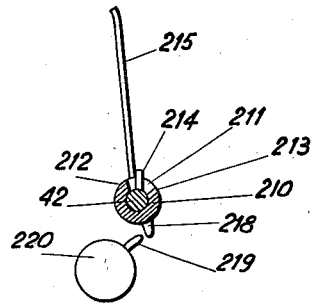
Fig. 26 is a section according to 26—26 of Fig. 25.
Figure 27:
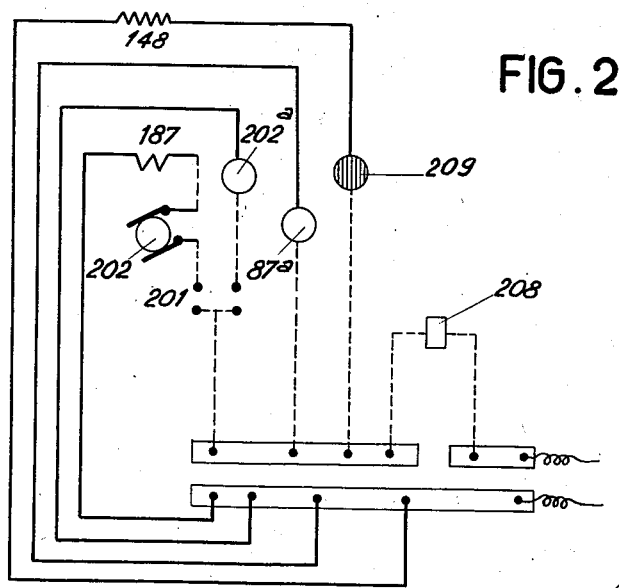
Fig. 27 is a diagrammatical view of the electric circuit provided for the operation of the machine.

In the water in the basin is partly submerged a drum 151, which is keyed on the axle 144. This drum has upon its peripheral wall rows of woolen threads 152, extending circumferentially thereof in staggered relation to each other as shown in Figure 15. A second drum 153 is rotatably mounted by its axle 154 parallel to the axle 144 between two uprights 155 fixed to the lateral sides of the basin 145. This drum is applied in a flexible manner against the drum 151, and its peripheral surface is covered with woolen threads 156 extending transversely of the threads 152.

With the drum 153 a moistening roller 157 may cooperate which is of a slightly ovoid shape formed of a soft rubber composition. This roller is rotatably mounted on an axle 158 mounted at the ends of two connecting rods 159 each movably mounted at the lower end of a lever 160. These levers are mounted to oscillate around an axle 161. At an intermediary point 162 of the lever 160 a connecting rod 163 is attached, which is moreover of an adjustable length due to a screwbolt system 164 and which is at its other end pivoted to a crank arm 165 keyed on a transversely extending shaft 166. On this shaft another crank arm 167 is keyed and connected by a connecting rod 168 to a lever 169, mounted for oscillating movement around the shaft 78, and having intermediate its length a roller 171 engaged in an eccentric cam groove 172 formed in a plate or disc 173, which is keyed on the shaft 79.

On the lever 169 the piston rod 174 of pump 100 is secured.

Springs 175 are interposed between each of the connecting rods 163 and the corresponding connecting rod 159. Triangles 176 are mounted for oscillating movement around an axle 177 on rigid cheeks 177a of each side of the guide 95. A blade spring tends to maintain these triangles in position shown in the drawings. One side of each of the triangles has a notch 179 with which co-operates a spur 180 fixed to the corresponding cheek 177a.

At the front of the machine a plate 181 is fixed on which is mounted in a quickly removable manner a strip of metal 182 serving as a guide for the packets or the like. The plate is formed with slots 183 permitting the passage of levers 184, keyed on the shaft 42. One of these levers 184 is rigid with the sleeve 48a. On the said shaft is furthermore keyed a finger 185, which permits operating the tipping of an oscillating chassis 186 supporting a mercury-contact 187, as shown in Figure 4.

A lever 188 is keyed on the shaft 42 and a sleeve 189 is loosely mounted around the shaft 79 and has a projection 190 situated in the same plan as the lever 188. The movement of the sleeve 189 by the shaft 79 takes place through the intermediary of a spiral 191. A catch 192 is also keyed on the axle 79.

A pawl 193 is mounted on an axle 194. This pawl has an abutment stem 195 for engagement by the projection 190 which exercises on it an effort directed towards the axle 194. The claw of the pawl is shown in 196 and it cooperates with the end of the tappet 192.

Between rear of the guiding rails 56—57 an isolating block 197 is fixed having a perforation 198 in which a pusher 200 is slidably mounted to move vertically under the action of a spring 199. This pusher has a contact pin 201, which operates the closing or opening of the electric circuits of a motor 202 supported by the frame on the inside of the machine and of a lamp 202a. The pusher 200 terminates at its lower end in a head 203 which is opposite one of the three lozenges 22. Through the rod 204 of the pusher is formed an opening 205 which serves for the passage of a stem or arm 206 fixed to the rear of the sliding piece 58. This lug has a notch 207.

A switch 208 permits closing the electric circuits of the machine on a suitable source of current. A signal lamp 209 lights up when this closing takes place.

Around the shaft 42 on the right hand side of the machine, a sleeve 210 is loosely mounted which has its upper portion formed with a notch 211 in the shape of a segment, limited by two radial abutment faces 212 and 213. The shaft 42 carries a pin 214 positioned for moving in the notch 211. On the sleeve 210 is keyed a lever 215 similar to the levers 184, and passing through a slot 216 formed in the supporting plate 181. Towards the right of this slot perforations 217 are formed through the supporting plate 181 for permitting the setting in position and the quick removal of the strip of angle metal 182. The sleeve 210 has a digit 218 for engaging the tappet 219 of a meter 220 advancing one unit each time the tappet 219 receives an impetus of the digit 218.

The operation of the machine is as follows:

In order to supply a stamp to a packet or the like, for example an envelope, it suffices to place same on the plate 181 and to advance it in such a manner that it pushes back at least one of the levers 184. Movement of any of these levers entails a corresponding rotation of the shaft 42; the lever 185, keyed on this shaft brings about the tipping of the oscillating chassis 186 bearing the mercury contact 187; and tipping of this contact closes the circuit of the electric motor 202, which then starts. Rotation of the axle 42 has in addition caused the lever 185, which is keyed on it, to turn from a corresponding angle; but the sleeve 210 has not turned because of the extent of notch 211.

The starting of the motor entails the rotation of the shaft 79 on which the disc cams 128, 173 and 78 are keyed. Rotation of cam 78 causes displacement of the lever 74 around its pivot 75, which through the medium of the connecting rod 72, the crank arms 71 and 70 and the connecting rod 38 causes movement to be imparted to the arm 61. The brake exercised by the blade 66 on contact with the tenon 67 at first prevents the sliding piece 58 from moving under the section of this effort, in such a manner that the arm 61 pivots around its pivot 63 until it bears against the front wall of the opening 59. During this oscillation movement, the end of the flexible claw 64 descends towards a ribbon of stamps 10, and penetrates into a line of perforations separating two adjacent stamps, by means of the space arranged between the ribbon 10 of stamps and the bottom 4 of the groove 3 by the rib or ribs of said bottom.

The movement continuing, the sliding piece 58 is pushed towards the front of its guide rails 56 and 57 and the ribbon of stamps 10 is carried along a distance equal to the length of a stamp. This carrying along is easy due to the lineal contact between the ribbon of stamps and the bottom 4 of the groove 3 and also due to the transverse curvature imposed on the ribbon of stamps and which gives it a notable rigidity. The stamp emerging from the groove 3 is directed downwards as shown in Fig. 17, on account of the projection 12, so as to prevent a convex shape towards the top.

The oscillation of the lever 74 has caused, through the intermediary of the abutment stem 80, of the tumbler 81 and the digit 89 the registration of one unit of the meter 91—93 corresponding to the ribbon of stamps in course of use.

During the period that the ribon of stamps 10 is advancing, the cam disc 128 has, through the intermediary of the lever 124, of the spring 125, of the crank arm 123 turned shaft 120 and caused an oscillation of the arm 119, in contact with the bearing 121, which has permitted a slight descending movement towards the bottom of the plunger 96 under the action of gravity and a flexible system, such as a spring (not shown, for the clarity of the drawings). This movement is limited by the pinching of the pipe 98 between the blades 129 and 130 flexibly induced towards one another by the spring 133.

The moistening roller 157, carried by the connecting rod 159, and having been suitably moistened in the course of the preceding phase through the rotation of the drums 151—153, is then carried out of reach of this latter by the intermediary of the levers 160, the connecting rods 163, the crank arms 165 and 167, the connecting rod 168 and the lever 169, which oscillates under the action of the cam-plate 173.

Impelled by the action of the springs 175, the axle 158 of the roller 157 follows fixed ramps 221 of the machine of such a shape that in the course of the movement the roller 157 seizes the stamp jutting out of the projection 12 arranged opposite, moistens it and applies it under pressure of the springs 175 against the cap 102 of the head of the plunger 96, previously lowered a short distance as has been seen above. No folding of the stamp is to be feared, because of its convex form towards the top.

During this movement, the axle 156 has caused the triangles 176 to tip around axles 177, the claws 180 offering no hindrance to the movement of tipping for this direction of rotation.

The rotation of the shaft 79 continuing, the arm 119 continues its movement of oscillation. The plunger 96 remaining immobile, as was mentioned above, the knife 105 is brought down sharply by the play of the slice lever 136. The blade 106 operates the detachment, by cutting, of the stamp jutting out of the projection 12. This cutting is not due to the fact that the rupture is exercised over a very taut portion of stamp ribbon, on the one hand by means of the penetration of the claw 64 in a line of perforation of the ribbon, on the other hand by means of the application by the spring 175, of the stamp against the cap 102. The previous tension of the portion of stamp ribbon therefore permits the use of a blade knife of ordinary steel, or even of any other material, and abolishes in addition the necessity of sharpening the blade.

At the end of the descending movement of the knife 105, the slice 137 escapes from the edge 138 of the support 108 of the knife and the knife is returned to a raised position under the action of the springs 114.

The movement of the shaft 79 continuing, the oscillation of the levers 160 continues and the moistening roller 157 leaves the cap 192 and completely releases the trajectory of the plunger 96. The axle 158 now takes hold against the fixed cheeks 177ᵃ of the frame. The oscillation of the lever 169 during this phase sets the pump 100 in suction, so that the moistened stamp is held by suction against the pad 102.

The arm 119 continuing its movement of oscillation towards the bottom engages the plunger 96 by pressure against the bearing ball 122. The stamp carried by the cap 102 is then applied against the envelope or other postal packet set on the plate support 181. The presence of the spring 125 ensures an elastic application and permits to take into account the differences in thickness of the packets or the like. On the other hand, the sockets 104 of the pad 102 ensures the latter suppleness, which permits a good application of the stamp, even if the packet is of irregular shape or the stamp is applied at a corner of the packet. The application of the stamp coincides with the setting at exhaust of the pump 100 by displacement of its rod 174, thus completely separating the cap 102 from the stamp.

In the course of the following phase, the oscillation in an upward direction of the arm 119 causes the slice lever 136 to re-ascend the length of the knife, and the head at the lower end of the lever 137 is engaged over the upper edge 138 of the knife by the plunger 96 being also brought back to its raised position.

Under the action of the cam 77, the arm 61 is impelled towards the rear. Due to the braking movement exercised by the blade 66 on the sliding piece 58, the arm 61 swings at first around the axle 63 and the flexible claw 64 moves upwardly from the line of perforations of the ribbon of stamps 10 into which it had been engaged. The sliding piece 58 is then shifted towards the rear to its original position.

Towards the end of the upward movement of the plunger 96, the levers 160 oscillate to swing the roller 157 towards the rear. During this movement the triangles 176 are returned to their original position under action of the blade springs 178, but cannot cause them to swing on account of the spurs 180. The lower sides 222 of the triangles 176 therefore guide the axle 158 as far as the ramps 221 the length of which it progresses until the roller 157 takes up its original position again against the drum 153.

During the rotation of the shaft 79 the sleeve 189 turns at first, impelled by the spring 191, until its projection 190 comes into contact with the abutment 195 of the pawl 193 which stops it.

The rotation continuing, the spiral spring 191 tightens. When the shaft 79 has accomplished almost a complete rotation the tappet 192 keyed to it, causes the pawl 196 to swing around its axle 194. The projection 190, escaping from the abutment 195, is then projected against the lever 188 by the action of spring 191 previously tightened. To this action is added also that of the spring 152.

The shaft 42, on which the lever 188 is keyed, is thus brought sharply back to its position of departure. This returning movement has the effect of cutting the circuit of the electric motor by the tipping of the chassis of the mercury contact 187 and of rapidly moving the levers 184 towards the front. Forward movement of the levers 184 ejects the postal packet or the like to which the stamp has just been applied.

The machine permits the application of stamps of different types. In the embodiment described, the carriage 1 has for this purpose, three grooves 3 for accommodating stamps of three values. In the position shown in the drawings, the machine is in position for applying the stamps of the central groove. If it is desired to apply the stamps of another groove, it is merely necessary to pull the arm 43 towards the front, which causes the latch 37 to escape from the notch 36. The wheel 34 is then turned to rotate shaft 33 and by means of the cables 25 and 26 draw the carriage 1 along the traverses 2 to the desired position. When the groove 3, corresponding to the value of stamp required is in position, the latch 37 drops into the corresponding notch 36 under the action of the spring 44 and at the same time, the arm 43 is brought back to its original position by the action of the spring 52.

It is not possible to operate the machine if one of the grooves 3 is not in the proper position. In fact, in this case, the arm 43 has not regained its bolted position, so that, when a packet or the like is moved along the platform 181 in position to make contact with the levers 184, it cannot push the levers back on account of the engagement of a spur 44a carried by the shaft 42 with the rear side of a notch 43a formed in the sleeve 41a.

When it is desired to apply another stamp alongside a stamp already applied, the strip 182 has to be removed and its fastening passed through another set of perforations 217. The packet or the like is set upon the platform against the guide 182 and shifted along the platform, so that the lever 215 as well as the sleeve 210 will turn with the shaft 42. The stamping having been effected in the shown manner and registered by the meter 220 in addition to the meter 91—93 concerned, the lever 215 is brought back to its original position by abutment of the spur 214 against the face 212.

The machine also has a device for its automatic locking the reels when the supply of stamps upon the reel is exhausted. After the last stamp having a postal or other value has been applied, there remains nothing more, in the particular groove, than a ribbon of paper without value which has a portion wound upon the reels.

After the application of the last stamp, the stem 206 comes back and its notch 207 passes opposite to the pusher 203. This movement is accomplished by the spring 199 which effects a downward movement and seeing that the lozenge 22 on which it applies is no longer held by the ribbon of stamps it engages in the opening 21, downward. This movement breaks, by the pin 201, the contacts, closing the circuit for the electric motor 202 as well as the signal lamp 202a.

I claim:

1. In a stamp applying machine, a frame, spools at the rear of said frame for holding stamp ribbons, tracks extending longitudinally of said frame for receiving ribbons of stamps from said spools, a shelf for receiving articles to be stamped, feeding means for advancing stamps along one of said tracks in step by step movements, a plunger shiftable vertically over said platform in front of said tracks, means for creating suction through said plunger to cause stamps to adhere to the plunger when advanced, means for moistening stamps adhering to the plunger, means for vertically reciprocating said plunger, a knife for severing stamps adhering to the plunger prior to downward movement of the plunger, and means for actuating all of said means in predetermined timed relation to each other.

2. In a stamp applying machine, a frame, a platform at the front of said frame for receiving an article to be stamped, a track extending longitudinally in said frame with its front end overhanging said platform, means for advancing a strip of stamps along said track, a plunger slidable vertically over said platform in front of said track, pneumatic means associated with said plunger for holding a stamp in engagement with the lower end of said plunger, when active, a knife slidable vertically back of said plunger, and means for reciprocating said plunger during application of stamps to articles upon said platform having means associated therewith for shifting the knife downwardly to sever a stamp from a strip of stamps prior to downward movement of the knife.

3. In a stamp applying machine, a frame, a platform at the front of said frame for receiving an article to be stamped, a track extending longitudinally in said frame with its front end overhanging said platform, means for advancing a strip of stamps along said track, a plunger slidable vertically over said platform in front of said track, pneumatic means associated with said plunger for holding a stamp in engagement with the lower end of said plunger when active, a knife slidable vertically back of said plunger, an arm mounted for vertical swinging movement and having lost motion engagement with said plunger for shifting the plunger vertically into and out of a stamp applying position, means for yieldably resisting downward movement of said knife, and means carried by said arm for shifting said knife downwardly and then releasing the arm prior to downward movement of the plunger.

4. In a stamp applying machine, a frame, a platform at the front of said frame for receiving an article to be stamped, a track in said frame having its front end overhanging the rear end of said platform, means for intermittently advancing a strip of stamps along said track, a vertically disposed guideway forwardly of said track, a plunger slidable vertically in said guideway and having its upper portion formed with a vertically extending slot, means for releasably holding a stamp at the front end of a strip of stamps against the under face of said plunger, a knife for severing stamps from said strip slidable in said guideway back of said plunger and yieldably held against downward movement, an arm mounted for vertical swinging movement with its free end portion loosely passing through the slot of said plunger, and a lever pivoted to said arm and yieldably held in position for engaging said knife and shifting the knife downwardly to a stamp severing position and then releasing the knife during movement of the arm downwardly in the slot into position to engage the plunger and shift the plunger downwardly to a stamp applying position.

5. In a stamp applying machine, a frame, a platform at the front of said frame for receiving an article to be stamped, a track in said frame having its front end overhanging the rear end of said platform, a stamp applying plunger slidable vertically in front of said track over the rear portion of said platform, means for shifting a strip of stamps along said track to project a stamp under said plunger, a pump in said frame, a tube extending from said pump to said plunger and communicating with a passage formed through the plunger, means for actuating said pump to exert suction through the plunger and hold the projected stamp against the under face of the plunger, a liquid receptacle, means for severing the stamp from said strip, a feed roller rotatably mounted in said receptacle, a delivery roller engaging said feed roller, an applying roller movable from out of engagement with said delivery roller across a stamp held by said plunger to moisten the stamp, and means for reciprocating plunger and into and out of a lowered position for applying the stamp to an article upon said platform.

6. In a stamp applying machine, a frame, a platform at the front of said frame for receiving an article to be stamped, a track in said frame having its front end overhanging the rear end of said platform, a stamp applying plunger slidable vertically in front of said track over the rear portion of said platform, a carriage slidable longitudinally of the track over the same, a vertical rocker arm pivoted to said carriage and having a head at its lower end extending longitudinally of the track, a claw extending forwardly from said head, means for rocking said rocker arm to swing the claw downwardly into engagement with a strip of stamps and shift the carriage forwardly to project a stamp under said plunger, means for holding the projected stamp to the plunger, means for severing the projected stamp from the strip of stamps, and means for reciprocating the plunger vertically to apply the stamp to an article upon the platform.

ALBIN GASCA.